April 12, 1966 K. BREUER 3,245,227
AXIALLY TILTABLE BALL COUPLING
Filed Jan. 18, 1963 3 Sheets-Sheet 1

INVENTOR
KARL BREUER

By Toulmin & Toulmin
Attorneys

April 12, 1966  K. BREUER  3,245,227
AXIALLY TILTABLE BALL COUPLING
Filed Jan. 18, 1963  3 Sheets-Sheet 3

INVENTOR
KARL BREUER

By Toulmin & Toulmin
Attorneys

United States Patent Office 3,245,227
Patented Apr. 12, 1966

3,245,227
AXIALLY TILTABLE BALL COUPLING
Karl Breuer, Mulheim-Spelldorf (Ruhr), Germany, assignor to Demag Aktiengesellschaft, Duisburg, Germany
Filed Jan. 18, 1963, Ser. No. 252,515
8 Claims. (Cl. 64—8)

The present invention relates to a shaft coupling with ball bearings and more particularly to a coupling where one portion thereof can be tilted in its axial direction.

Shaft couplings with an axially tiltable portion have been proposed before, but such couplings have a difference in ratio between the driving and the driven part and suffer in performance upon the axial tilting of either the driving or the driven portion.

It is also known that such couplings consist of roller bodies engaging exterior and interior portions of a special structure. Construction of this type of coupling requires expensive manufacturing machinery.

Accordingly, it is an object of the present invention to interconnect two rotatable elements, for example two shafts, in a simple and economical way and practically without torsional play, whereby a rolling contact is to be provided at the transmission points.

Another object of this invention is to transmit a uniform speed of rotation from one portion of the coupling to the other one.

Still another object of the present invention is to allow axial tilting of one portion of the coupling by means of sidewardly adjustable balls thereby maintaining perfect power transfer conditions at various axial displacements of one portion of the coupling.

The invention consists in the novel combination of two portions of a coupling so that one portion can be tilted relative to the other one and a plurality of balls, operatively interconnecting said portions, can roll sidewardly so as to maintain perfect power transfer conditions between the portions of the coupling at any tilting angle of one of said portions. The balls are embedded in cylindrical recesses positioned in both portions of the coupling. These recesses allow the said sideward movements of the balls.

Other objects and advantages of the invention will be apparent from the following in conjunction with the accompanying drawings, in which like reference numerals refer to like parts throughout the several figures, and wherein.

Figure 1:
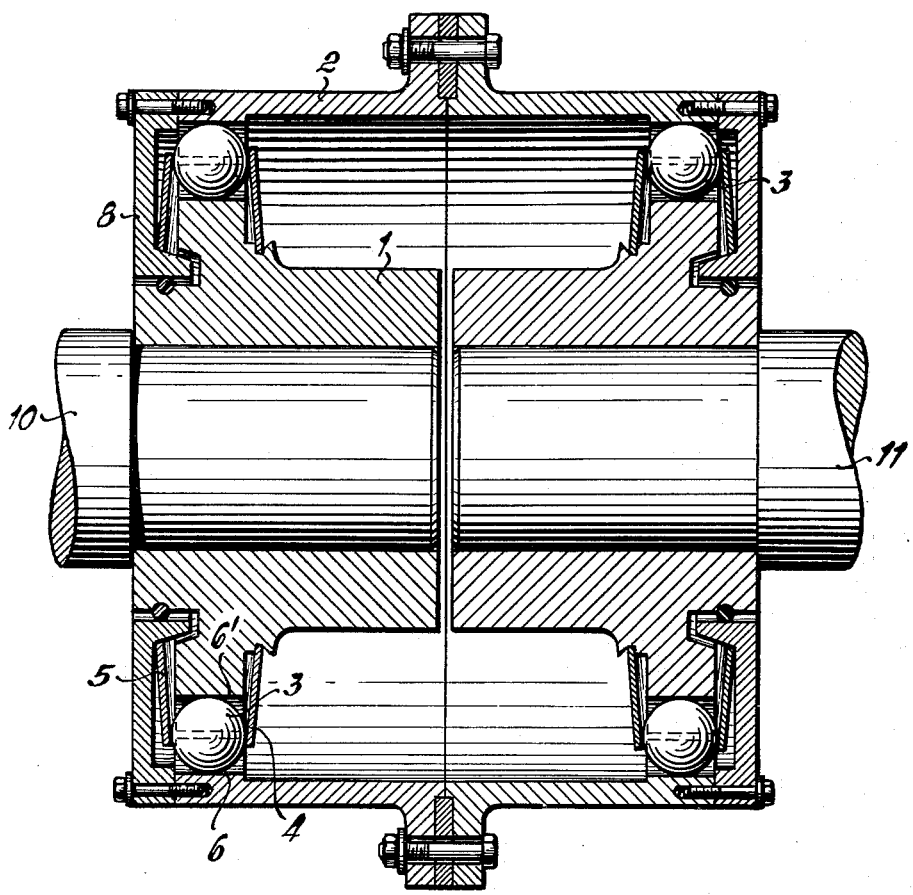
FIGURE 1 is an axial cross-section through a preferred embodiment of the invention wherein the balls are resiliently supported.
Figure 2:
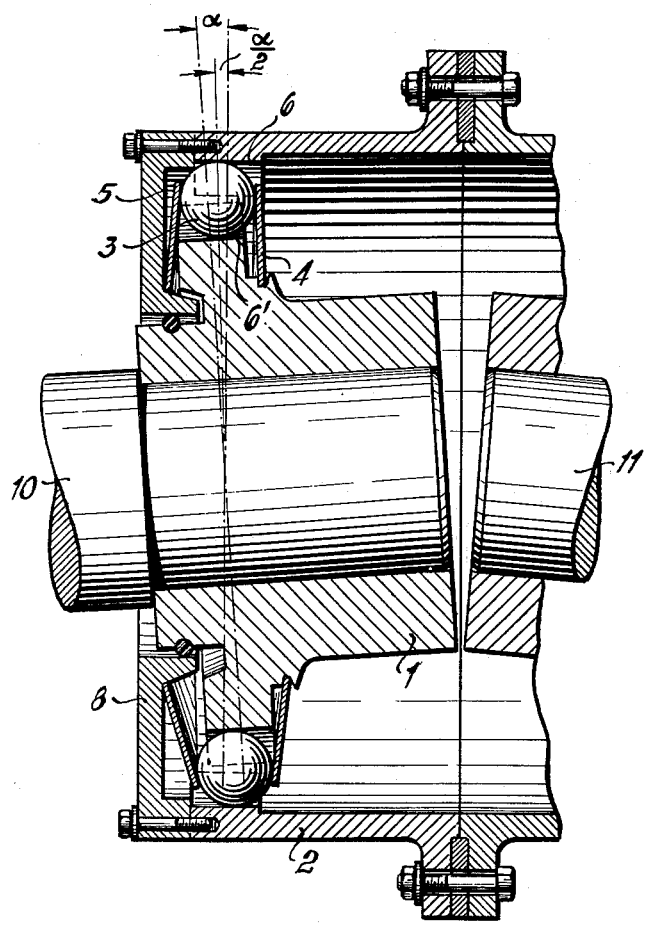
FIGURE 2 is a partial view of FIGURE 1 wherein the shaft portion of the coupling is tilted.
Figure 3:
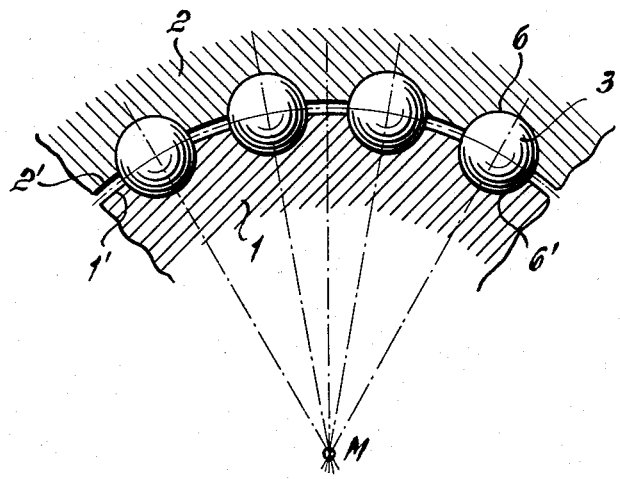
FIGURE 3 is a partial section through the balls shown in FIGURES 1 and 2.

FIGURES 1 and 2 illustrate the invention clearly in that they show a shaft end both in normal position (FIG. 1) and in tilted position (FIG. 2). FIGURES 1 and 2 show a radial section of the preferred embodiment of the coupling with an interior portion 1 and an exterior portion 2. Both portions have cylindrical half-bores 6 and 6', respectively, in which balls 3 are inserted. The balls 3 constitute the power transfer means between portions 1 and 2 of the coupling, which portions are separated from each other. In the embodiment shown in FIGURES 1 and 2 they are separated from each other by a gap. A shaft 10 is fixedly connected with the interior portion 1. The arrangements of the balls 3 and the aforementioned gap are shown in FIGURE 3.

The gap surfaces are indicated by numerals 1' and 2' respectively.

FIGURES 1 and 2 further show the means correcting the axial displacement for the balls 3. In the preferred embodiment these means are springs 4 and 5 which hold the balls 3 in position by exerting equal pressure upon them (FIG. 1). In FIGURE 2 the shaft 10 with the interior portion 1 is shown in tilted position, thereby demonstrating how the balls 3 move sidewardly in order to maintain the same kind of solid contact upon tilting that exists in the normal position of the shaft 10 with the interior portion 1. The springs 4 and 5 now maintain all the balls positioned in the same plane thereby also attaining uniform contact between portions 1 and 2 by an equal distance of movement of all the balls 3.

Laterally, the balls 3 and the sides of portions 1 and 2 are covered by a cover 8a. FIGURE 1 further shows a way of interconnecting two couplings.

Figure 4:
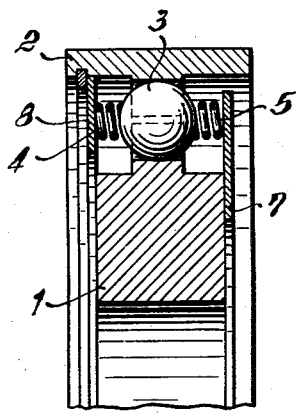
FIGURE 4 is an axial section through part of the coupling showing two web rings elastically holding the balls.

FIGURE 4 shows a different embodiment of the axial displacement means for the balls 3, i.e. web rings 7 and 8 cooperating with suitable spring means 4 and 5.

The ball race is held in place by separate spring elements acting upon the race from opposite sides with equal force (see e.g., FIGS. 1, 2 and 4). One of these spring elements 4 is supported against the inner coupling member while the other one 5 is supported against the outer coupling member.

By means of these force-exerting springs 4 and 5 the balls which are seated for free rotation in axially extending cylindrical raceways are not only held in position therein, but are forced into a central radial plane. When under load there is a change of angular relationship, the balls 3 will roll into a radial plane inclined to the center through an angle equal to half of the change of angular relationship. The spring elements will here serve to correctly position the balls which move back and forth in their raceways, one spring being supported against the outer coupling member while the other spring is supported against the inner coupling member. In this manner all the balls of the race will be kept in a single plane.

By constructing the coupling in such a manner that the tilting angle of one portion of the coupling is $\alpha$ and the angle by which the balls 3 move sidewardly is $\alpha/2$ a uniform speed transmission is caused by this ratio. This results from the fact that a ball positioned between two planes moves a distance $s/2$ when one of the planes is moved a distance $s$ and the other plane remains stationary.

It will be apparent that the improved coupling is particularly useful in an environment where the driving part and the driven part are arranged in a housing or on a common frame. Preferably, all transfer surfaces are hardened. The main advantages of the coupling are: low price, simple manufacturing methods, high efficacy, little wear, long life, uniform speed of rotation of the driving and the driven portions, considerable tilting of one portion of the coupling (about 30–40°), absence of play of the axial displacement means, smooth running qualities, adaptability to smallest and highest speeds, the balls roll sidewardly and do not slide, the measurements of the coupling can be calculated exactly due to the predetermined ratio of an axial tilting angle of $\alpha$ to a ball displacement angle of $\alpha/2$.

It will be understood that this invention is susceptible to modification in order to adapt it to different usages and conditions, and, accordingly, it is desired to comprehend such modifications within this invention as may fall within the scope of the appended claims.

What is claimed is:

1. An axially tiltable coupling comprising in combination a shaft, an interior portion, said interior portion being fixedly connected with said shaft, an exterior portion being juxtaposed to said interior portion, a plurality of closely spaced cylindrical half-bores in said interior and exterior portions, a plurality of balls positioned substantially without play in said cylindrical half-bores, and separate means for the axial displacement of said balls, one of said means being supported on one side by said interior portion and the other on the other side by said exterior portion and being adapted to push said balls into one plane upon tilting of one portion of the coupling relative to the other one and keeping said balls free from axial play, and said balls supporting said interior portion throughout the periphery thereof in spaced relation to said exterior portion.

2. An axially tiltable coupling according to claim 1 wherein an axial tilting of one of said portions against the other one by angle $\alpha$ results in a sideward rolling movement of said balls by angle $\alpha/2$.

3. An axially tiltable coupling according to claim 1 wherein said means for the axial displacement of said balls are spring means.

4. An axially tiltable coupling according to claim 1 wherein said means for the axial displacement of said balls include web rings.

5. An axially tiltable coupling according to claim 1 wherein said means for the axial displacement of said balls are web rings combined with spring means.

6. A rotationally rigid coupling which is axially shiftable and angularly variable consisting of cylindrical inner and outer parts separated by a clearance space across which the torque is transmitted from the one part to the other, said parts having registering semi-cylindrical longitudinal channels containing balls for transmitting the torque, means for holding the balls in position and guiding them in the channels so that they will all be kept in a single radial plane, said means comprising separate spring elements for acting with equal force upon opposite sides of the balls, one of the spring elements being attached to and supported against one of the coupling parts while the other spring element is attached to and supported by the other coupling part.

7. The coupling of claim 6, in which the spring elements are ring-shaped plate-like disks.

8. The coupling of claim 7 in which pairs of coiled springs are arranged to act upon the balls and are supported against said ring-shaped disks, one of the disks being attached to and supported against one of the coupled parts while the other disk is attached to and supported by the other coupled part.

References Cited by the Examiner

UNITED STATES PATENTS

| | | | |
|---|---|---|---|
| 1,935,926 | 11/1933 | Wolf | 64—7 |
| 2,427,237 | 9/1947 | Suczek | 64—21 |
| 2,615,317 | 10/1952 | Rzeppa | 64—21 |
| 2,902,844 | 9/1959 | Rzeppa | 64—21 |

FOREIGN PATENTS 731,547  6/1955  Great Britain.

ROBERT C. RIORDON, *Primary Examiner.*